W. J. BELL.
SIFTING TESTING MACHINE.
APPLICATION FILED MAR. 9, 1914.

1,120,012.

Patented Dec. 8, 1914.
3 SHEETS—SHEET 1.

Witnesses:
Harry King
C. M. Sweeney

Inventor:
Willard J. Bell
By Carlos Ralvi
Attorneys

W. J. BELL.
SIFTING TESTING MACHINE.
APPLICATION FILED MAR. 9, 1914.

1,120,012.

Patented Dec. 8, 1914.
3 SHEETS—SHEET 2.

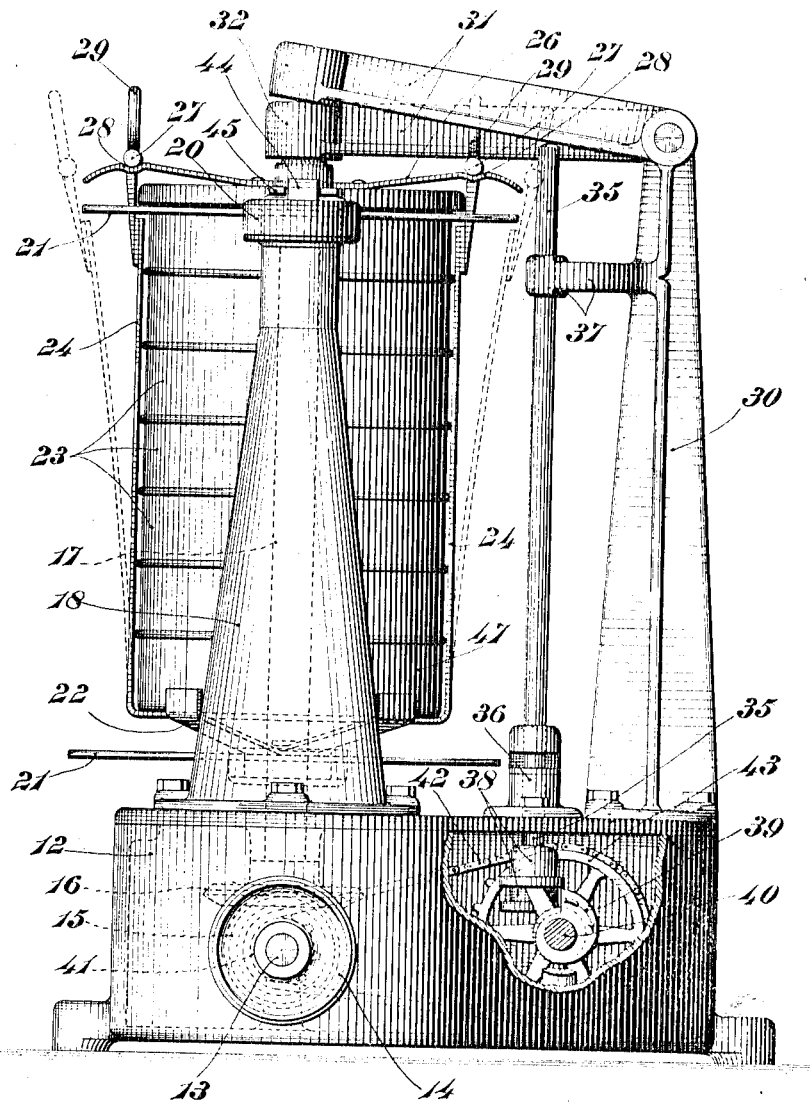

UNITED STATES PATENT OFFICE.

WILLARD J. BELL, OF NEWAYGO, MICHIGAN.

SIFTING TESTING-MACHINE.

1,120,012.   Specification of Letters Patent.   Patented Dec. 8, 1914.

Application filed March 9, 1914. Serial No. 823,338.

*To all whom it may concern:*

Be it known that I, WILLARD J. BELL, a citizen of the United States, residing at Newaygo, in the county of Newaygo and State of Michigan, have invented or discovered certain new and useful Improvements in Sifting Testing-Machines, of which the following is a specification, reference being had therein to the accompanying drawings.

This invention relates to a machine for shaking or agitating standard testing sieves in making fineness tests of Portland cements, ores, fertilizers and other dry comminuted materials.

Heretofore in making standard tests by using testing sieves, which are six to eight inches in diameter and fitted with standard wire mesh, the work has usually been done by shaking or agitating the sieves by hand to shake out the "fines." This manner of making tests is, however, necessarily a somewhat crude and uncertain one, as the personal element entering into the shaking or agitating does not admit of making any two tests just alike; and although various efforts have been made in the past to produce machines that would successfully shake these testing sieves, so as to standardize not only the sieves themselves but the method of shaking, such machines have not proved to be practically successful or satisfactory.

The present invention has for its object to provide a machine for shaking or agitating testing sieves which will accomplish the desired result in a uniform and satisfactory manner, so as to secure uniform standards of comparison of the sifted material.

Figure 1:
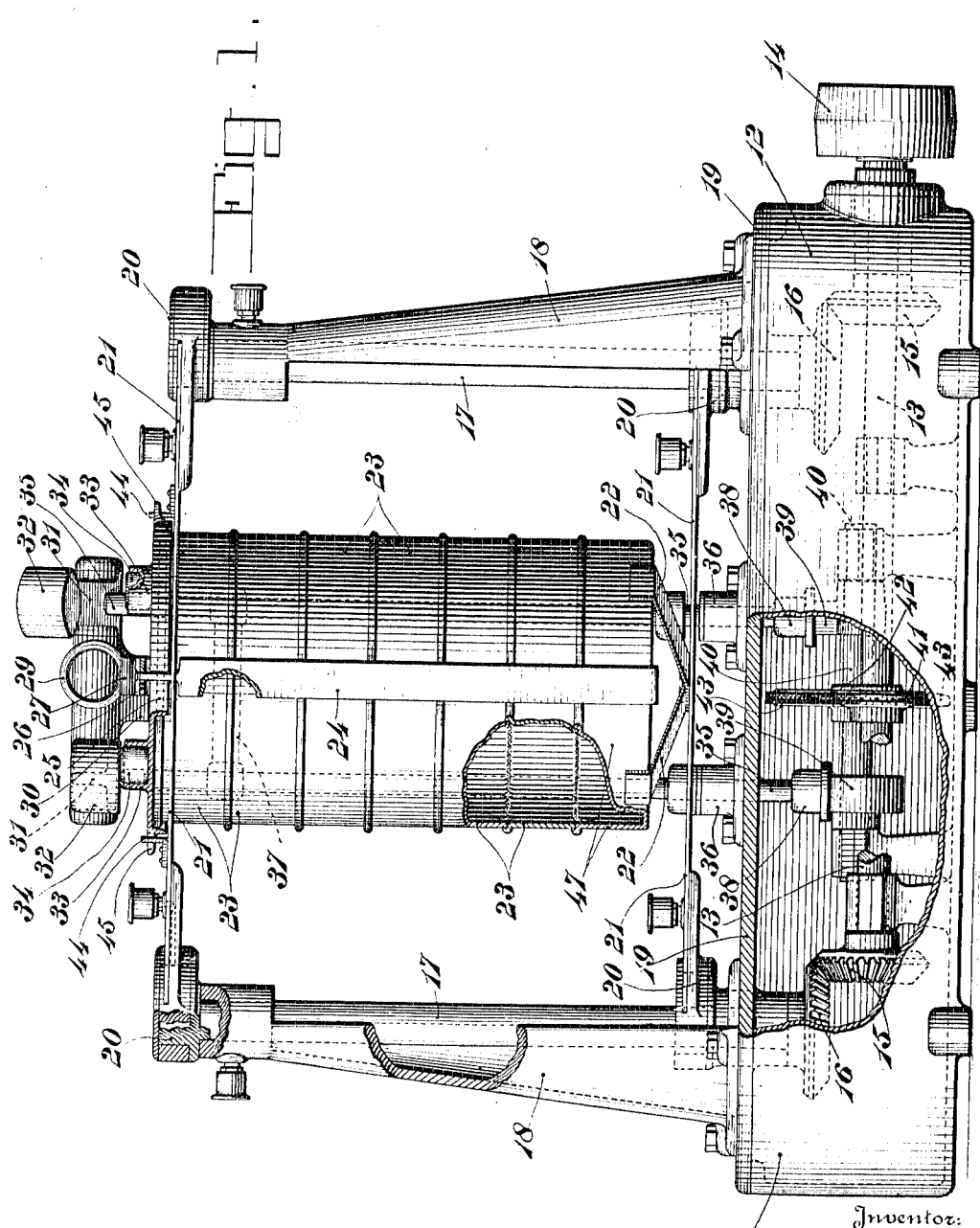
Figure 2:
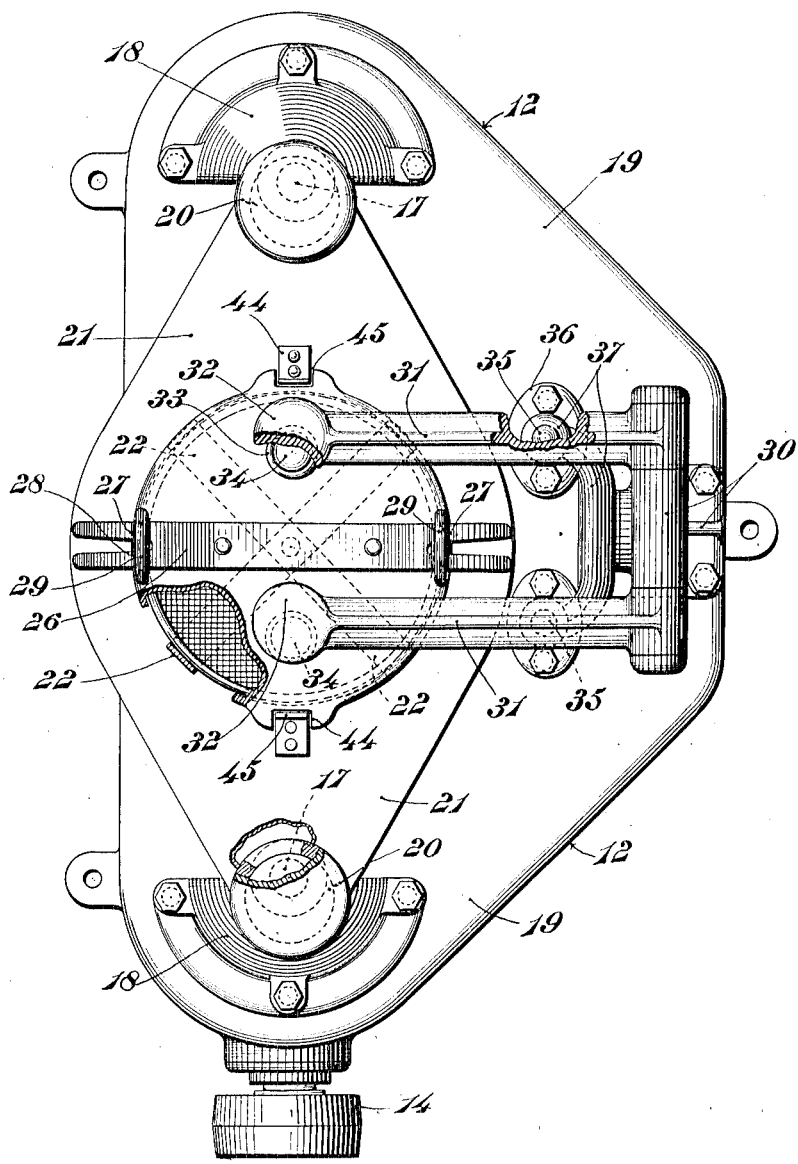

In the accompanying drawings Figure 1 is a front view of the improved sifting testing machine. Fig. 2 is a plan view thereof and Fig. 3 is a side view looking from the right of Figs. 1 and 2.

Referring to the drawings, 12 denotes a suitable base which is preferably made in the form of a closed box adapted to be filled with oil to a point high enough to insure perfect lubrication of all of the working parts contained therein. Journaled in the said base is a driving shaft 13 provided with a pulley 14 which may be belted to any suitable source of power. The shaft 13 carries bevel gears 15 meshing with similar bevel gears 16 fixed to the lower ends of vertical shafts 17 having bearings in standards 18 bolted or otherwise properly secured to the cover 19 of the base 12. The shafts 17 are provided at or near their upper and lower ends with eccentrics 20 encircled by suitable straps connected with upper and lower shaking plates 21, or the said straps may be formed integral with said plates if desired.

Mounted on the lower plate 21 is a spring support 22 for a series of testing sieves 23 which nest into each other and which are bound together by a U-shaped strap 24, said sieves being of graduated mesh from the top sieves, which is of coarse mesh, downward. The uppermost of the superposed testing sieves 23 is somewhat loosely encircled by the upper shaking plate 21 and on said uppermost sieve rests a cover plate 25 to which is riveted or otherwise attached a transversely extending spring 26 having forked outwardly projecting ends to be engaged by T-shaped securing devices 27 at the upper ends of the U-shaped strap 24, the latter being of sufficient flexibility so that its ends may be sprung outward to release said securing devices from the said spring 26, or may be moved inward for the purpose of bringing these securing devices to fastening positions, as shown in the drawings. To hold the said securing devices in place the spring 26 is preferably provided with slightly hollowed out seats 28. The spring 26 is also preferably provided with upwardly projecting rings 29 which serve as handles by which the series of sieves 23, bound together by the strap 24 and the spring 26, may be conveniently handled in removing them from the machine or replacing them therein. As the sieves are not rigidly connected with shaking plates 21 the upper shaking plate is provided with lugs 44 which enter notches 45 in the cover plate 25.

Secured to the base 12, or to the cover 19 thereof, is a standard 30 to the upper end of which are pivoted hammer bars 31 provided at their free ends with hammers 32 for percussively jarring the cover plate 25 and thereby percussively agitating the series of sieves 23 sustained by the spring support 22. To this end the said cover plate is provided with bosses 33 in which are preferably inserted cushioning wooden blocks 34 on which the said hammers 32 may strike. The hammer bars are lifted by means of push rods 35 which are guided near their lower ends in bosses 36 in the cover 19, and which pass near their upper ends through guide arms 37 extending horizontally from the standard 30. The heads 38 on the lower ends of the push rods 35 rest on lifting tappets or cams 39 on a shaft 40 mounted within the hollow base 12 and operated from a sprocket wheel 41 on the shaft 13 connected by a chain 42 with a larger sprocket wheel 43 on the said shaft 40. The lifting tappets or cams 39 are of such construction as to raise the rods 35 slowly, and, by a sudden drop, permit them to descend quickly, to enable the hammers to operate percussively on the cover 25.

From the foregoing it will be understood that the series of connected testing sieves 23 sustained by the spring support 22 on the lower shaking plate 21 will have circular shaking movements imparted to them from the eccentrics 20 on the shafts 17, this circular shaking movement being a desirable one in agitating the testing sieves, as is well known to those skilled in the art. Also in addition to the circular shaking movements imparted to the series of testing sieves the latter will be jarred percussively by the hammers 32 acting directly or indirectly on the cover plate 25 at the top of the series of sieves; this percussive jarring serving to keep the meshes of the sieves well cleared. Thus by the combined shaking and percussive jarring movements which will be imparted to the testing sieves uniform results will be secured mechanically, so that proper standards of comparison, in operating on comminuted materials, may be obtained.

When the connected series of sieves 23 are to be removed from or inserted into the machine the hammer bars 31 may be thrown back out of the way on their pivot 46. The fine material passing through the series of sieves may be received in the pan or receptacle 47 resting on the spring support 22 and thus taking the place which might otherwise be occupied by the lowermost sieve, said pan or receptacle being, as herein shown, uniform, in size and shape, with the sieves 23.

This machine is not only of very great advantage in saving the labor which has heretofore been required in shaking testing sieves by hand, but it also saves considerable wear and tear on the sieves themselves; as, in the hand shaking process, the sieves have to be pounded or jarred by striking them against some object, or with some instrument, in order to jar the fine material through the meshes thereof, and this method of jarring the sieves tends to wear them out much more rapidly than does the mechanical jarring effected by the testing machine.

It is designed to provide automatic mechanism for stopping the testing machine after the same has been run for a certain predetermined time, but as this automatic stopping mechanism forms no part of the present invention it is not herein illustrated.

The invention is not to be understood as being limited to the details herein shown, as these may be widely varied, within the province of mechanical skill, without departing from the essence of the invention, which, it is believed, will result in standardizing sieve shaking, and thus more accurate results will be secured, in the use of testing sieves, than have heretofore been attained.

Having thus described my invention I claim and desire to secure by Letters Patent:—

1. In a sifting testing machine, the combination with a suitable base, of means above said base for yieldingly supporting a vertical series of sieves, means for imparting horizontal circular or gyratory shaking movements to said sieves, and means for percussively jarring the said yieldingly supported sieves.

2. In a sifting testing machine, the combination with a suitable base, of means above said base for yieldingly supporting a vertical series of sieves, means for imparting horizontal circular or gyratory shaking movements to said sieves, a top plate to rest on the vertical series of sieves, one or more hammers to act on said top plate, for percussively jarring the series of yieldingly supported sieves, and means for operating said hammer or hammers.

3. In a sifting testing machine, the combination with two vertical shafts each of which is provided with two eccentrics, and means for sustaining and rotating said shafts, of lower and upper horizontally moving shaking plates connected at their opposite ends with said eccentrics and serving to impart circular or gyratory shaking movements to a vertical series of testing sieves, a spring support on said lower shaking plate for yieldingly sustaining said sieves, a cover plate adapted to rest on the topmost of said series of sieves, and percussive means for acting on said cover-plate for jarring the sieves as they are shaken by the horizontal movements imparted thereto from the said eccentrics.

4. In a sifting testing machine, the combination with two vertical shafts each of which is provided with two eccentrics, of means for sustaining and rotating said shafts, lower and upper horizontally moving shaking plates connected at their opposite ends with said eccentrics and serving to support and to impart circular or gyratory shaking movements to a vertical series of connected testing sieves, a spring support on said lower shaking plate for yieldingly sustaining said series of sieves, a cover plate adapted to rest on the topmost of said series of sieves, and percussive means for acting on said cover plate for jarring the sieves as they are shaken by the horizontal movements imparted thereto from the said eccentrics, said percussive means consisting of hammer bars provided with hammers, push rods for lifting the said hammer bars, and means for operating the said push rods in such a manner as to permit them to fall suddenly.

5. In a sifting testing machine, the combination with a hollow base adapted to hold oil to lubricate the working parts contained therein, of a driving shaft journaled in said base, vertical shafts operated from said driving shaft and provided with eccentrics, upper and lower shaking plates operated by said eccentrics and serving to impart horizontal shaking movements to a series of superposed sieves, a spring support on said lower shaking plate for yieldingly sustaining said series of sieves, a cover plate adapted to rest on the topmost of the sieves, hammers to act percussively on said cover plate to jar said sieves, vertical push rods for lifting said hammers, and rotating tappets or cams within said base, for lifting said hammers.

6. In a sifting testing machine, the combination with a suitable base, of a horizontal rotating shaft within said base, two vertical shafts extending upward and driven from said horizontal shaft, said vertical shafts being provided at or near their lower and upper ends with eccentrics, lower and upper horizontal shaking plates connecting said eccentrics and serving to impart circular or gyratory shaking movements to a vertical series of testing sieves, and a spring support on said lower shaking plate for yieldingly sustaining said vertical series of sieves.

7. In a sifting testing machine, the combination with a suitable base, of a horizontal rotating shaft within said base, two vertical shafts extending upward and driven from said horizontal shaft, said vertical shafts being provided at or near their lower and upper ends with eccentrics, lower and upper horizontal shaking plates connecting said eccentrics and serving to impart circular or gyratory shaking movements to a vertical series of testing sieves, a spring support on said lower shaking plate for yieldingly sustaining said vertical series of sieves, a second horizontal shaft within said base and operatively connected with and driven from said first-named shaft, said second shaft being provided with tappets, a top plate to rest on said vertical series of sieves, hammers for acting percussively on said top plate and lifting rods, operated by said tappets, for raising said hammers.

8. In a sifting testing machine, the combination with a hollow base adapted to hold oil to lubricate the working parts contained therein, of a driving shaft journaled in said base, vertical shafts operated from said driving shaft and provided with eccentrics, upper and lower shaking plates operated by said eccentrics and serving to impart horizontal shaking movements to a series of superposed sieves, means on the lower shaking plate for yieldingly supporting the sieves, a cover plate to rest on the topmost of the sieves, hammers to act percussively on said cover plate to jar said sieves, vertical push rods for lifting said hammers, and rotating tappets or arms, within said base, for lifting said hammers.

9. In a sifting testing machine, the combination with a hollow base adapted to hold oil to lubriate the working parts contained therein, of a driving shaft journaled in said base, vertical shafts operated from said driving shaft and provided with eccentrics, upper and lower shaking plates operated by said eccentrics and serving to impart horizontal shaking movements to a series of superposed sieves, a cover plate to rest on the topmost of the sieves, hammers to act percussively on said cover plate to jar said sieves, vertical push rods for lifting said hammers, rotating tappets or arms, within said base, for lifting said hammers, and means for binding the series of sieves together so that they may be maintained in working position and may be placed in the machine or removed therefrom collectively.

In testimony whereof I affix my signature, in presence of two witnesses.

WILLARD J. BELL.

Witnesses:
 COLIN R. WALCOTT,
 LOUIS F. ECKARD.